M. SOPCENSE.
WATER BICYCLE.
APPLICATION FILED AUG. 13, 1919.

1,337,372.

Patented Apr. 20, 1920.
2 SHEETS—SHEET 1.

INVENTOR
Mike Sopcense
BY Adam E Scha
ATTORNEY

M. SOPCENSE.
WATER BICYCLE.
APPLICATION FILED AUG. 13, 1919.
1,337,372.
Patented Apr. 20, 1920.
2 SHEETS—SHEET 2.
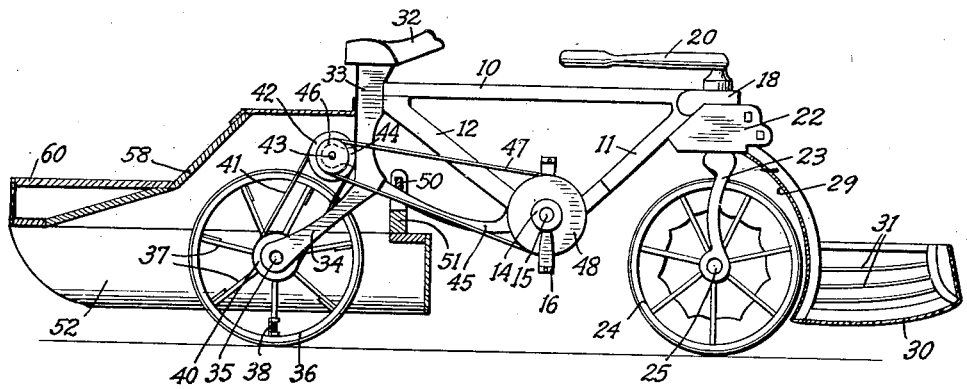
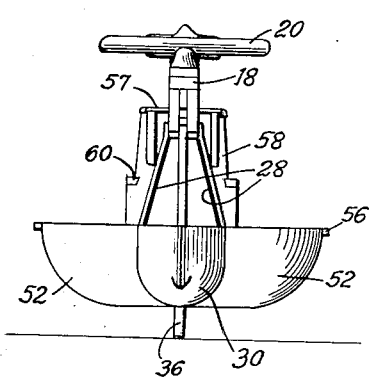
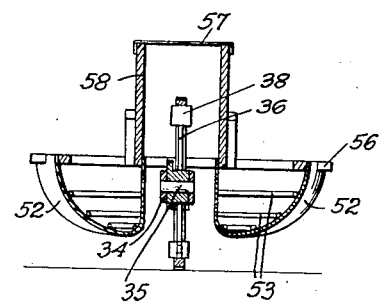
INVENTOR
Mike Sopcense
BY Adam E. Schatz
ATTORNEY

UNITED STATES PATENT OFFICE.

MIKE SOPCENSE, OF SOPERTON, WISCONSIN.

WATER-BICYCLE.

1,337,372.  Specification of Letters Patent.  Patented Apr. 20, 1920.

Application filed August 13, 1919. Serial No. 317,833.

*To all whom it may concern:*

Be it known that I, MIKE SOPCENSE, a citizen of Austria, residing at Soperton, county of Forest, and State of Wisconsin, have invented certain new and useful Improvements in Water-Bicycles, of which the following is a specification.

This invention relates to improvements in vehicles, and particularly to types adapted to be pedally propelled over the surface of water.

The principal object of the invention is to provide a vehicle in the form of a pedally operated bicycle adapted to be operated over the surface of either land or water in a convenient manner.

These and other like objects are attained by the novel construction and combination of parts hereinafter described, and shown in the accompanying drawings, forming a material part of this disclosure, and in which—

Fig. 3 is a longitudinal sectional view taken on line 3—3 of Fig. 2.

Fig. 4 is a front elevational view of the same, and

Fig. 5 is a vertical sectional view taken on line 5—5 of Fig. 1.

Figure 1:
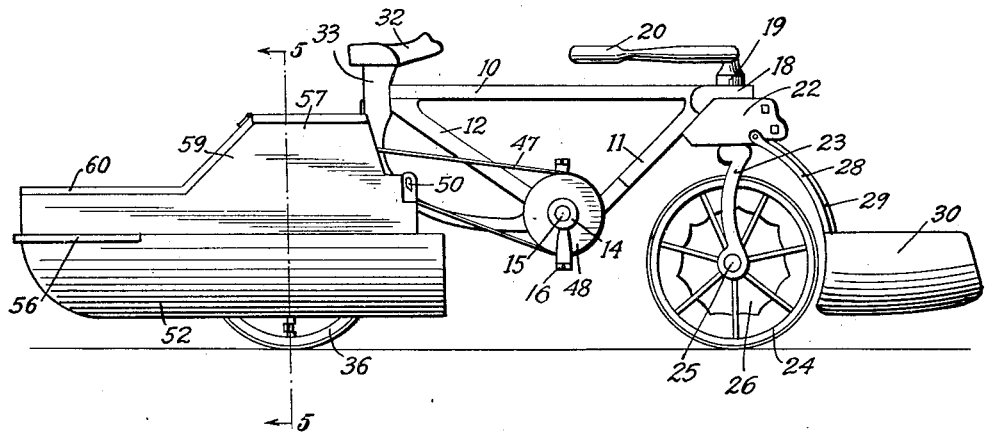
Figure 1 is a side elevational view showing a water bicycle made in accordance with the invention.
Figure 2:
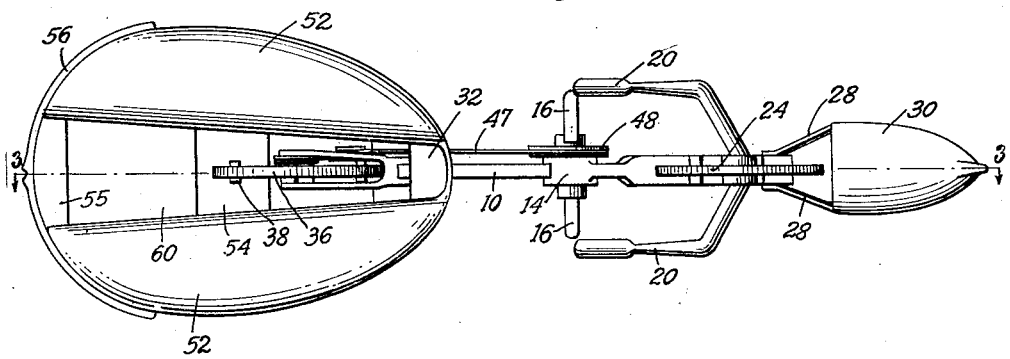
Fig. 2 is a bottom plan view thereof.

The frame of the bicycle is substantially triangular in side elevation, consisting of a horizontal rail 10, joined at its ends by an angular front element 11, the same extending downwardly and rearwardly, while the opposed element 12, is similarly connected to the rail 10, at the rear and extends downward and to the front, the point of convergence being extended laterally, forming a bearing 14, in which is journaled a pedal shaft 15, having connected at its ends pedals 16, adapted to be operated in the usual manner.

A widened extension 18 is formed with the front of the rail 10, and in it is a vertically mounted post 19, from which extend the steering handles 20, the same being formed so as to project equally on both sides and extending rearwardly so as to be conveniently manipulated by the operator, the lower end of the post extends downward through a block 22, and is formed rigid with the front fork 23, between which is mounted a front wheel 24, upon the spindle 25.

Engaged with the spokes of the wheel 24, is a disk 26, the same being adapted to act as a rotary rudder in directing the vehicle.

Secured to the block 22, are pairs of forks 28, having between them a guard 29, and extending outward from the forks 28 is a hollow elliptical casing 30, acting as a buoy or float by which a part of the bicycle is supported when used upon the water, this float being provided with a plurality of ribs 31 acting as a frame therefor.

At the rear of the rail 10 is a saddle 32, supported upon a standard 33, having rear forks 34, carrying a spindle 35, upon which is mounted the rear driving wheel 36, the same having a plurality of spokes 37, to which are attached transverse plate elements 38, acting as paddle wheels by which the bicycle is propelled in the water.

Also secured upon the spindle 35, is a driving wheel 40, over which is a belt 41, leading from a pulley 42, mounted upon a spindle 43, carried in a bracket 44, secured to the rear of the standard 33, and extending between the lower portion of standard 33 and the bearing 14, is a curved arm 45, so as to form a rigid brace. Also mounted on the spindle 43 is another pulley 46 driven by a belt 47, from the driving pulley 48, rigidly secured upon the spindle 15. Thus, as the pedals are actuated, rotary motion is transmitted to the driving wheel 36 in an obvious manner.

A transverse bar 50, rests upon the connecting arm 45, the same partially supporting a bracket 51, having engaged at its outer extending end, an opposed pair of floats 52, which extend rearwardly of the bicycle, upon either side of the driving wheel 36 and are braced by interior ribs 53 so as to retain their shape when subjected to stress. These floats are interconnected by cross plates 54 and 55, the latter being at their extremity, and are further joined by an outer partial band 56, encircling their rear end and firmly holding them in position.

A hollow superstructure 58, is also engaged with the upper portion of the floats 52, the same acting as a casing for the driving wheel 36, and is attached by a horizontal plate 57 to the rear standards 33, these plates having side elements 59, and a cover plate 60, so as to prevent the driving wheel from throwing water upward.

In operation, a rider being positioned upon the seat 32, the pedals 16 may be actuated as usual, while the belts transmit rotary motion to the driving wheel 33, causing the paddles to engage with the water and propel the bicycle, which may be steered in a convenient manner due to the disk 26, operated by the fork handle 20, it is being understood that the floats 30 and 52 are so proportioned as to sustain the weight of the bicycle and the rider thereon.

Having thus described my invention what I claim as new and desire to secure by Letters Patent, is—

1. In a water bicycle, the combination with a frame, a driving wheel rotatable at the rear of said frame, a steering wheel, supports for said steering wheel, said supports being pivoted in a vertical axis at front of said frame, and means for actuating said supports, of a countershaft secured to said frame, a pair of pedals engaged in said frame, through which power may be communicated to said countershaft and to said driving wheel, a pair of floats at the rear of said frame, on either side of said driving wheel, and a single float supported in advance of said steering wheel, said floats being adapted to sustain the weight of the bicycle and the rider thereon.

2. In a water bicycle, the combination with a frame, of a driving wheel rotatably engaged at the rear thereof, means for rotating said driving wheel, a steering wheel at the front of said frame, means for actuating said steering wheel, a pair of floats arranged upon each side of said driving wheel, a single float extended beyond said steering wheel, a rotary rudder secured to the spokes of said steering wheel, and a plurality of paddles engaged with the spokes of said driving wheel whereby said vehicle may be propelled.

3. In a water bicycle, the combination with a rigid frame, means for supporting a rider thereon, a pedal device carried by said frame, a driving wheel at the rear of said frame, said driving wheel being driven by said pedal device, a steering wheel at the front of said frame and means for actuating said steering wheel, of a pair of floats arranged at the sides of said driving wheel, said floats being of hollow construction, and internally ribbed, a single float arranged in front of said steering wheel, a disk secured to the spokes of said steering wheel adapted to act as rotary rudder, and a plurality of paddles engaged with the spokes of said driving wheel, said paddles being adapted to propel the bicycle when said pedals are actuated.

In testimony whereof I have affixed my signature.

MIKE his X mark SOPCENSE.

Witness:
ESTELLE G. STICH.